US012644834B2

(12) United States Patent
Schönfuss et al.

(10) Patent No.: US 12,644,834 B2
(45) Date of Patent: Jun. 2, 2026

(54) TURBIDITY SENSOR, IN PARTICULAR FOR DETERMINING A CELL DENSITY OF A SUSPENSION

(71) Applicant: Hamilton Bonaduz AG, Bonaduz (CH)

(72) Inventors: Dirk Schönfuss, Rhäzüns (CH); Louis Willi, Bonaduz (CH); Gabriela Fisch, Chur (CH); Yavuz Çelik, Rhäzüns (CH); David Brémaud, Uetikon am See (CH)

(73) Assignee: Hamilton Bonaduz AG, Bonaduz (CH)

( * ) Notice: Subject to any disclaimer, the term of this patent is extended or adjusted under 35 U.S.C. 154(b) by 135 days.

(21) Appl. No.: 18/699,975

(22) PCT Filed: Oct. 6, 2022

(86) PCT No.: PCT/EP2022/077864
§ 371 (c)(1),
(2) Date: Apr. 10, 2024

(87) PCT Pub. No.: WO2023/061857
PCT Pub. Date: Apr. 20, 2023

(65) Prior Publication Data
US 2024/0418647 A1      Dec. 19, 2024

(30) Foreign Application Priority Data

Oct. 12, 2021    (DE) ..................... 10 2021 126 439.1

(51) Int. Cl.
G01N 21/59           (2006.01)
(52) U.S. Cl.
CPC .................................... G01N 21/59 (2013.01)
(58) Field of Classification Search
CPC .. G01N 21/59; G01N 21/8507; G01N 21/532; G01N 21/534; A47L 2401/10
See application file for complete search history.

(56) References Cited

U.S. PATENT DOCUMENTS

| | | | |
|---|---|---|---|
| 7,060,979 B2 | 6/2006 | Manz et al. | |
| 2006/0103842 A1 | 5/2006 | Tokhtuev et al. | |
| (Continued) | | | |

FOREIGN PATENT DOCUMENTS

| | | | |
|---|---|---|---|
| CN | 207832626 U | * | 9/2018 |
| CN | 110646379 A | | 1/2020 |
| (Continued) | | | |

OTHER PUBLICATIONS

International Preliminary Report on Patentability for corresponding PCT/EP2022/077864 mailed Apr. 16, 2024, 6 pgs.
(Continued)

*Primary Examiner* — Maurice C Smith
(74) *Attorney, Agent, or Firm* — Rankin, Hill & Clark LLP

(57)                   ABSTRACT

A turbidity sensor for detecting clouding of a fluid by particulates contained in the fluid, wherein the turbidity sensor includes a fluid detection region for the reception and metrological detection of fluid; a radiation source for emitting radiation into the fluid detection region; a first radiation sensor for detecting a first part of the radiation emitted by the radiation source; and a second radiation sensor, different from the first radiation sensor, for detecting a second part of the radiation emitted by the radiation source that is different from the first part, wherein at least a portion of the fluid detection region is located between the first radiation sensor and the second radiation sensor, the second radiation sensor is located in a beam path of the first part of the radiation emitted by the radiation source that is detected by the first radiation sensor.

16 Claims, 4 Drawing Sheets

(56) References Cited

U.S. PATENT DOCUMENTS

| | | | |
|---|---|---|---|
| 2010/0157304 A1 | 6/2010 | Takahashi et al. | |
| 2016/0033407 A1 * | 2/2016 | Tokhtuev ............... | G01N 21/49 |
| | | | 250/459.1 |
| 2017/0102317 A1 | 4/2017 | Bertsch et al. | |
| 2019/0360930 A1 | 11/2019 | Barnes et al. | |

FOREIGN PATENT DOCUMENTS

| | | | |
|---|---|---|---|
| DE | 102006052892 B4 | | 7/2021 |
| EP | 1754045 A1 | | 2/2007 |
| EP | 1991859 A1 | | 11/2008 |
| JP | S57101743 A | | 6/1982 |
| JP | S6335378 U | * | 3/1988 |

OTHER PUBLICATIONS

German Search Report for corresponding DE 10 2021 126 439.1 mailed Jul. 21, 2022, 7 pgs.

International Search Report for corresponding PCT/EP2022/077864 mailed Jan. 10, 2023, 11 pgs.

Espacenet Bibliographic data: CN 110646379 (A), Published Jan. 3, 2020, 1pg.

Espacenet Bibliographic data: DE 102006052892 (B4), Published Jul. 15, 2021, 1pg.

Espacenet Bibliographic data: JP S57101743 (A), Published Jun. 24, 1982, 1pg.

* cited by examiner

TURBIDITY SENSOR, IN PARTICULAR FOR DETERMINING A CELL DENSITY OF A SUSPENSION

This Application claims priority in PCT application PCT/EP2022/077864 filed Oct. 6, 2022, which claims priority in German Patent Application DE 10 2021 126 439.1 filed on Oct. 12, 2021, which are incorporated by reference herein.

The present invention concerns a turbidity sensor for capturing a cloudiness of a fluid through suspended matter contained in the fluid, where the turbidity sensor comprises:

A fluid capturing region for accommodating and for metrological capturing of fluid A radiation source for emitting radiation into the fluid capturing region, A first radiation sensor for capturing a first part of the radiation emitted by the radiation source, and A second radiation sensor different from the first radiation sensor for capturing a second part different from the first part of the radiation emitted by the radiation source, Where at least one section of the fluid capturing region is situated between the first and the second radiation sensor.

BACKGROUND OF THE INVENTION

Such turbidity sensors, like also the turbidity sensor of the present invention, are used inter alia for ascertaining a cell density of a suspension by means of a cloudiness of the suspending fluid effected by the suspended cells. The cells then form the aforementioned suspended matter. The mentioned metrological capturing is therefore radiation metrological capturing, which ascertains the cloudiness of the fluid on the basis of the radiation emitted by the radiation source.

Turbidity sensors of the type mentioned at the beginning are deployed for example in bioreactors and the like, where cells, in particular living cells, are propagated in a liquid such as for instance a nutrient solution. A turbidity sensor can thus be utilized to ascertain the success of a cell propagation in a bioreactor.

A turbidity sensor with the features named in the beginning is known from US 2019/0360930 A1. The known turbidity sensor comprises in one embodiment a plurality of radiation sensors, namely exactly three. The radiation sensors and the radiation source are arranged around the fluid capturing region. A first radiation sensor is situated in a straight line opposite the radiation source, such that the part captured by it of the radiation emitted by the radiation source is a transmission fraction which reaches the first radiation sensor after passage through the fluid capturing region without deviation.

A second radiation sensor is situated on the same side of the fluid capturing region as the radiation source, but offset with respect to the radiation source in the circumferential direction about the fluid capturing region. This second radiation sensor captures a second part of the radiation emitted by the radiation source, which is scattered by the suspended matter particles contained in the fluid with a radiation component opposite to the incident direction of the radiation emitted by the radiation source.

A third radiation sensor is situated on the same side of the fluid capturing region as the first radiation sensor, but offset vis-à-vis the latter in the circumferential direction about the fluid capturing region. The third radiation sensor captures a part of the radiation emitted by the radiation source which is scattered, i.e. deflected, during passage through the fluid capturing region by the suspended matter particles contained in the fluid, where a radiation component, proceeding in parallel to the incident direction of the emitted radiation, of the part of the emitted radiation reaching the third radiation sensor is aligned with the incident direction. The radiation reaching the third radiation sensor is less strongly scattered or more specifically deflected from the incident direction than the radiation reaching the second radiation sensor.

The radiation fractions reaching the individual radiation sensors change as a function of the quantity, based on a reference volume of the fluid, of suspended matter contained in the fluid. A small quantity, based on a reference volume of the fluid, of suspended matter decreases with an increasing number of suspended matter particles the fraction of radiation traversing the fluid capturing region in a straight line which is captured by the first radiation sensor, without at first increasing to the same extent the fraction of scattered radiation captured by the second and the third radiation sensor.

An average quantity, based on the reference volume of the fluid, of suspended matter further decreases the fraction of radiation traversing the fluid capturing region with an increasing number of suspended matter particles, namely normally in a non-linear relationship with the number of suspended matter particles, where the fraction of scattered and thus deflected radiation which reaches the third radiation sensor increases.

A large quantity, based on the reference volume of the fluid, of suspended matter further decreases the fraction of radiation traversing the fluid capturing region, but with a rising number of suspended matter particles increases the fraction of radiation which is scattered by the suspended matter with a radiation component directed against the incident direction and which consequently is captured by the second radiation sensor captures.

The known turbidity sensor thus allows a large measurement range with regard to the quantity of suspended matter contained in the fluid. However, the known turbidity sensor requires a relatively large installation space and a relatively complex design of the fluid capturing region. The fluid capturing region is, to a large extent, surrounded by the radiation source and the radiation sensors and yet needs to be accessible to fluid which is to be captured.

Advantageously slim turbidity sensors with a comparatively small installation space requirement are known for example from US 2010/0157304 A1, EP 1 991 859 A, EP 1 754 045 A1, and U.S. Pat. No. 7,060,979 B2, where the improved installation space utilization is always at the expense of the available measurement range with regard to the quantity of suspended matter contained in the fluid across which the turbidity sensors can be used with sufficient accuracy.

SUMMARY OF THE INVENTION

It is the task of the present invention to improve a turbidity sensor of the type mentioned in the beginning such that with the smallest possible installation space requirement, the turbidity of a fluid based on a reference volume of the fluid can be captured as accurately as possible over the largest possible range of different quantities of suspended matter contained in the fluid.

The present invention solves this task in a turbidity sensor mentioned in the beginning by having the second radiation sensor situated in the beam path of the first part captured by the first radiation sensor of the radiation emitted by the radiation source. Thereby the first and the second radiation sensor can be arranged one behind the other with respect to the radiation of the radiation source incident on the first radiation sensor. The second radiation sensor has passing through it radiation emitted by the radiation source. In this way, an arrangement known from the state of the art of the radiation sensor next to the radiation source or next to the fluid capturing region can be avoided, which makes possible the formation of a slim turbidity sensor.

At the same time, the second radiation sensor can capture a radiation fraction which is scattered or reflected, as the case may be, by the suspended matter present in the fluid capturing region with a radiation component which is opposite to the incident direction of the radiation emitted by the radiation source into the fluid capturing region. Furthermore, the first radiation sensor can capture a radiation fraction which traverses the fluid capturing region without deviation or, depending on the size of the sensor capturing surface of the first radiation sensor, at a small deviation angle. With the traversing radiation fraction, even small quantities of suspended matter present in the fluid capturing region can be ascertained with good accuracy. With the radiation fraction scattered with a radiation component against the incident direction, large quantities of suspended matter present in the fluid capturing region can be ascertained with good accuracy. Through appropriate calibration of the turbidity sensor, average quantities lying between the small and the large quantities of suspended matter can also be ascertained with good accuracy.

Furthermore, with the turbidity sensor presented here there can be obtained a capture signal whose dependence on the quantity of suspended matter in the fluid to be recorded exhibits very good linearity. By 'quantity' there is always meant here a quantity based on a reference volume of fluid, in order to ensure the comparability of capture results. This advantageously high linearity ensures simple signal processing of capture signals of the turbidity sensor and thereby high capture accuracy.

In principle it is not rules out that the turbidity sensor presented here comprises one or several further radiation sensors. In order to achieve a slim turbidity sensor, however, it is preferable for the turbidity sensor to exhibit only the first and the second radiation sensor. This also suffices, due to the two radiation sensors which preferably lie opposite one another diametrically across the fluid capturing region, for achieving high capture accuracy.

The fluid can as matrix fluid be a gas or a liquid, in which the suspended matter is accommodated. The suspended matter can be droplets of a further liquid different from the matrix fluid, then the fluid as matrix fluid and the further liquid form an emulsion, and/or it can be solids, then the fluid as matrix fluid and the solids form a suspension. In a preferred application of the turbidity sensor discussed here, the suspended matter is biological cells, in particular living cells. But dead cells too, which normally exist unavoidably alongside the living cells in a bioreactor, can be captured by the turbidity sensor.

In principle, good measurement with a meaningful result can be performed with any electromagnetic radiation emitted by the radiation source. Preferably, electromagnetic radiation with a wavelength in the range of visible light or higher is used.

For example, radiation emitted by the radiation source with a wavelength of 590 nm or higher already provides very meaningful results. To avoid interference with a turbidity measurement through radiation or radiation fractions originating from other sources than the radiation source, the radiation emitted by the radiation source preferably comprises radiation in the transition range between visible light and infrared radiation. Especially preferably, the radiation emitted by the radiation source preferably comprises 'near-infrared radiation' with a wavelength in the range from 775 nm to 3000 nm, where radiation with a wavelength of 780 nm to 900 nm, in particular with a wavelength of 840 nm to 865 nm, has proved especially advantageous for a measurement of turbidity, in particular caused by biological cells. In the mentioned wavelength range, the turbidity sensor is insensitive to color changes of the fluid to be captured metrologically, where for the radiation with a wavelength of 840 nm to 865 nm there are available especially high-performance radiation sensors.

A preferred radiation source is or comprises, due to its small installation size, at least one light-emitting diode, where especially preferably the light-emitting diode is enclosed by a glass body as a 'glass LED', since the radiation emission behavior of a glass LED exhibits especially low temperature dependence. Other radiation sources than LEDs can likewise be used. In order to achieve a turbidity sensor with low installation space requirements, the radiation source preferably comprises exactly one LED, although it is also possible to use several LEDs.

In order to achieve the slimmest possible turbidity sensor, the radiation source, the second radiation sensor, the fluid capturing region, and the first radiation sensor are preferably arranged—in the named sequence—behind one another, especially preferably arranged in a straight line behind one another along a radiation emission direction of the radiation source.

In principle, the second radiation sensor can be formed at least section-wise from a material transparent to the radiation emitted by the radiation source, for instance analogously to a semi-transparent mirror, with the difference that the sections of the second radiation sensor which are opaque to the emitted radiation do not necessarily comprise mirror surfaces but rather radiation-sensitive capture surfaces.

An especially effective traversing of the second radiation sensor by radiation emitted by the radiation source can be obtained by the second radiation sensor exhibiting an aperture penetrating through it, through which radiation emitted by the radiation source arrives essentially unimpeded from the radiation source to the first radiation sensor. The use of radiation-transparent material to form the second radiation sensor is then unnecessary. The material of the second radiation sensor can be then chosen freely.

The penetrating aperture is preferably a singe contiguous aperture. The penetrating aperture can, however, be subdivided into different part-apertures which are configured at a distance from one another at the second radiation sensor. The penetrating aperture is preferably an aperture with a circular cross-section, in order to make possible the most symmetrical radiation through the second radiation sensor about an optical axis leading from the radiation source to the first radiation sensor. In case of doubt, the optical axis can be assumed to be the shortest radiation path from the radiation source to the first radiation sensor. It should, however, as already indicated above, not be ruled out that the penetrating aperture exhibits a grid-like shape, interrupted by radiation-sensitive part-surfaces of the second radiation sensor.

In principle it should not be ruled out that the first and/or the second radiation sensor exhibits or exhibit, as the case may be, a curved radiation-sensitive sensor capturing surface. For the most compact arrangement possible of the radiation sensors, however, it is advantageous if the first radiation sensor exhibits a planar first radiation-sensitive sensor capturing surface and if the second radiation sensor exhibits a planar second radiation-sensitive sensor capturing surface. The radiation-sensitive sensor capturing surfaces of the first and the second radiation sensor are arranged at the turbidity sensor facing towards one another, i.e. a normal vector going out from the respective sensor capturing surface has in a Cartesian component system a vector component which points towards the respective other sensor capturing surface. In turn, a compact arrangement of the radiation sensors with the most efficient signal yield possible can be obtained even with weak radiation incident on them by having the first and the second sensor capturing surface arranged in parallel to one another. In the latter preferred case, the normal vectors of the two sensor capturing surfaces point towards one another, i.e. within the usual manufacturing and assembly tolerances they are preferably directed in parallel and opposite to one another.

For facilitated arrangement of a defined fluid capturing region in a fluid to be captured by the turbidity sensor, according to a preferred development of the present invention the radiation source, the first radiation sensor, and the second radiation sensor are accommodated in a sensor housing. Thereby the mentioned components of the turbidity sensor are displaceable together. Moreover, the first radiation sensor and the second radiation sensor, preferably also the radiation source, are preferably arranged in the sensor housing immovably relative to one another, such that their common displacement through displacement of the sensor housing has no effect on the measurement accuracy achievable with the turbidity sensor.

For protection from external influences, in particular from the fluid which is to be captured metrologically, the mentioned components of the turbidity sensor are preferably screened by the sensor housing against the external environment of the sensor housing. Normally, in the external environment there is situated the fluid which is to be captured metrologically with the suspended matter expected in it. Preferably, therefore, the fluid capturing region is open towards the external environment of the sensor housing, for example in the form of a fluid conduit penetrating through the sensor housing. Especially preferably, the fluid capturing region is a section of the external environment of the sensor housing, which with respect to the rest of the external environment merely exhibits a distinctive position relative to the sensor housing, for example in the form of a groove volume of a groove configured at the sensor housing. The groove can be limited by outer surface sections of the sensor housing and can have radiation emitted by the radiation source radiating through it.

The sensor housing is preferably formed at least sectionwise from a metal, in particular from stainless steel, such that it is chemically especially resistant against outside influences. Here, sections of the sensor housing can act reflectively and undesirably reflect towards the second radiation sensor radiation emitted by the radiation source into the fluid capturing region. The second radiation sensor captures this reflected radiation. In principle, this radiation fraction reflected from the sensor housing can, through appropriate calibration, be subtracted from the radiation fraction captured by the second radiation sensor in total, in order to ascertain the useful radiation fraction scattered and/or reflected respectively by the suspended matter as information about the turbidity of the fluid. It is more advantageous, however, if this radiation fraction reflected from the sensor housing as erroneous radiation shining into the second radiation sensor is quantitatively as small as possible. Therefore according to a preferred development of the present invention it is provided that at least one section of the sensor housing facing towards the second radiation sensor is surface-processed in order to modify, in particular to reduce, its reflectance in the wavelength range of the radiation emitted by the radiation source. The surface processing can consist in forming macroscopic facet surfaces, for instance through appropriate machining. The facet surfaces can be so aligned that radiation emitted by the radiation source which is incident on the facet surfaces is reflected by the facet surfaces away from the second radiation sensor and preferably also away from the fluid capturing region.

Additionally or alternatively, the surface processing can result in increasing the roughness of surface sections of the sensor housing, such that an appropriately rougher or more specifically roughened surface section reflects less radiation than an equally large smooth and/or metallic as the case may be blank surface section.

Additionally or alternatively, the surface processing can be a surface coating with a material which absorbs in the wavelength range of the radiation emitted by the radiation source. Such surface coating can for example be realized through the application of a varnish.

Advantageously at the turbidity sensor, radiation originally emitted by the radiation source, having reached the fluid capturing region, can starting from the fluid capturing region arrive at the radiation sensors without the radiation sensors being contaminated by the fluid present in the fluid capturing region. To this end, the sensor housing can exhibit a first and a second disc each of which lets through radiation of the radiation source. The fluid capturing region preferably lies spatially between the first and the second disc. The first disc can preferably screen the first radiation sensor and the second disc can preferably screen the second radiation sensor against the fluid capturing region. For a compact construction, the first and the second disc are preferably situated at a distance from one another lying opposite one another in the beam path of the radiation source.

Mechanically and also chemically especially resistant discs can be obtained by the first and/or the second disc being formed of a mineral material, for example a corundum. An especially preferred material as disc material is sapphire glass, i.e. aluminum oxide. Sapphire glass is hard and extremely resistant to scratches and also chemically durable.

The first and/or the second disc, in particular when made from a mineral material, is preferably bonded with the sensor housing through a meltable cement. In the molten, flowable state the meltable cement wets both the first and/or the second disc and also a section of the sensor housing surrounding the first and/or the second disc and then solidifies. The melting point of the cement is chosen so high that it is significantly higher than the ambient temperatures occurring in conventional normal measuring operation, for instance of the fluid to be captured, but lower than the lower melting point out of the melting point of the material of the sensor housing and the melting point of the material of the disc fixed by the cement.

In order to arrange the first radiation sensor positively in the sensor housing relative to the disc using simple means, the first radiation sensor can be pre-tensioned in the direction towards the first disc through a first pre-tensioning force. Additionally or alternatively, for the same reason the second radiation sensor can be pre-tensioned in the direction towards the second disc through a second pre-tensioning force.

Between a radiation sensor and the disc screening it against the fluid capturing region there can be arranged, to prevent the incidence on the radiation sensor of interfering radiation of an undesirable wavelength originating from a source other than the radiation source, an optical filter which lets through electromagnetic radiation in a predetermined wavelength range and does not let through outside this wavelength range. In practice, a daylight filter has proved itself as the mentioned optical filter. The daylight filter blocks light in the visually perceptible wavelength range and permits the passage of electromagnetic radiation of longer wavelength. The optical filter arranged between the radiation sensor and the disc is preferably a filter which lets through electromagnetic radiation in the wavelength range of longer than 750 nm, in particular of longer than 800, even more strongly preferred of longer than 840 nm and otherwise blocks electromagnetic radiation of shorter wavelengths, in particular in the wavelength range of visible light. This applies to the first and/or the second radiation sensor and to the disc screening the respective radiation sensor.

According to a preferred structural development of the present invention, the first radiation sensor can be accommodated in a first radiation sensor assembly. The first radiation sensor assembly can be or comprise a first mounting component. Such a mounting component can be designed in such a way that on the one hand it permanently holds the first radiation sensor, normally with the interposition of a first circuit board directly carrying the first radiation sensor, and on the other it can be arranged in the sensor housing with narrow gap dimensions, for instance with a clearance fit. The first radiation sensor assembly is preferably sealed against a first housing component of the sensor housing by means of a first sealing component. This seal preferably abuts against the side of the first radiation sensor assembly facing away from the first disc, since the first radiation sensor assembly is screened in the opposite direction precisely through that first disc against fluid from the external environment, in particular from the fluid capturing region. The first housing component can be a housing lid or a housing plug, which closes off an aperture, preferably end-side aperture, of the sensor housing. To facilitate the assembly of the turbidity sensor, the first housing component closes off that aperture of the sensor housing through which the first radiation sensor assembly was introduced into the sensor housing. The first radiation sensor assembly is then situated preferably between the first disc and the first housing component.

In principle, between the first housing component and the first radiation sensor assembly there can be arranged a separate pre-tensioning means, such as for instance a compression spring, an elastomeric ring or the like, in order to exert the aforementioned first pre-tensioning force on the first radiation sensor assembly. To avoid an unnecessarily high number of components, preferably the first sealing component effects the first pre-tensioning force. The first sealing component is therefore preferably a sealing component made from an elastomeric material, such as for instance an O-ring.

That which applies to the first radiation sensor, preferably applies alternatively or additionally mutatis mutandis also to the second radiation sensor with proviso that the specification 'first' is to be replaced by 'second'. Therefore, the second radiation sensor can preferably be accommodated in a second radiation sensor assembly, where the second radiation sensor assembly can be sealed against a second housing component of the sensor housing by means of a second sealing component. The second radiation sensor assembly can be or comprise a second mounting component. The second mounting component can be designed in such a way that on the one hand it permanently holds the second radiation sensor, normally with the interposition of a second circuit board directly carrying the second radiation sensor, and on the other it can be arranged in the sensor housing with narrow gap dimensions, for instance with a clearance fit. The second sealing component preferably effects here the second pre-tensioning force, although quite generally a pre-tensioning component, such as a compression spring, an elastomeric ring or the like, can be provided to effect the pre-tensioning force.

The second housing component too, is preferably introduced into an aperture of the sensor housing through which previously the second radiation sensor assembly had been introduced into the sensor housing. The second housing component preferably comprises an electronic assembly, for example a base circuit board with electronic components, such as for instance with at least one integrated circuit configured for processing signals of the first and the second radiation sensor.

The part of the sensor housing accommodating the first radiation sensor assembly can be firmly bonded with the first housing component, for instance through gluing or welding, in particular through laser welding. Likewise the part of the sensor housing accommodating the second radiation sensor assembly can be firmly bonded with the second housing component, again for example through gluing or welding, preferably through laser welding.

The first and the second radiation sensor assembly are preferably accommodated in the same part of the sensor housing, which preferably is configured as an integral sensor housing part in which the first and/or the second disc is or are also accommodated as the case may be.

The second sealing component is preferably an elastomeric seal, in particular an O-ring. To avoid a separate mounting for the radiation source, the radiation source can also be accommodated in the second radiation sensor assembly. The second sensor arrangement and the radiation source are preferably held on an integrally configured second mounting component.

To fix the radiation source in the second radiation sensor assembly, the radiation source can be in abutment engagement with the second pre-tensioning component, in particular with the second sealing component, such that the second pre-tensioning component, in particular the second sealing component, pre-tensions the radiation source directly in the direction towards the second disc. The second pre-tensioning component, in particular the second sealing component, can consequently exert a pre-tensioning force directed towards the second disc both directly on the radiation source and indirectly via the second mounting component on the second radiation sensor. The second mounting component is then arranged between the second radiation sensor and the second pre-tensioning component, in particular the second sealing component.

The design discussed here of the turbidity sensor allows the use of an advantageously slim sensor housing. The sensor housing can therefore extend with its largest dimension along a longitudinal axis. The sensor housing is preferably at least section-wise cylindrical, in particular where the first and the second radiation sensor and especially preferably also the radiation source are arranged. The mentioned longitudinal axis is then preferably the cylinder's axis, or in the case of a section-wise conical design the conus axis. Instead of a cylindrical sensor housing, an at least section-wise prism-shaped sensor housing can also be used.

The first and the second disc can each be accommodated at the housing oriented transversely to the longitudinal axis.

The fluid capturing region can then be configured as a groove in the sensor housing running transversely to the longitudinal axis. The first and the second disc are preferably oriented orthogonally to the longitudinal axis. Likewise, a longitudinal extension direction of the groove forming the fluid capturing region preferably runs orthogonally to the longitudinal axis of the sensor housing.

The emission characteristic of the radiation source, in particular in a preferred form of an LED, can be subject to changes caused by ageing. Additionally or alternatively, the capture characteristic of at least one radiation sensor can be subject to changes caused by ageing.

In order to be able to respond to such changes in the emission characteristic and/or the capture characteristic and prevent a loss of accuracy of the turbidity sensor, the present invention concerns a turbidity sensor assembly which comprises a previously described turbidity sensor and a first calibration body for the correction and/or calibration as the case may be of the turbidity sensor.

The first calibration body preferably serves for the correction and/or calibration as the case may be of the first radiation sensor, which is reached by radiation traversing the fluid capturing region. For rapid and uncomplicated, but at the same time secure arrangement of the first calibration body, the latter is preferably connectable detachably with the sensor housing. It can, as a sleeve extending along a sleeve axis, in particular a jar-like sleeve with a bottom and a side wall projecting from it along the sleeve axis, surrounding the sleeve axis in a closed manner, be slid along the longitudinal axis of the sensor housing onto the latter. In the arranged at the sensor housing state, the sleeve axis is parallel or collinear with the longitudinal axis of the sensor housing.

For facilitated arrangement, the first calibration body which is designed as a jar-like sleeve can exhibit a duct penetrating through the sleeve, through which air enclosed between the first calibration body and the turbidity sensor when the first calibration body is arranged at the turbidity sensor can escape. The duct is preferably configured in the bottom of the jar-like first calibration body, since firstly no interfering incidence of light into the fluid capturing region is to be feared from a duct arranged in this manner and secondly until complete arrangement of the first calibration body at the turbidity sensor the duct is available for escape of air. The same applies furthermore when removing the first calibration body from the turbidity sensor. Here it is advantageous if air can flow into the space formed between the first calibration body and the turbidity sensor and becoming greater through the removal. Then the removal does not have to take place against the effect of the ambient atmosphere, but only against the friction between the first calibration body and the turbidity sensor.

Alternatively, the first calibration body can as an elastic clamp which completely grips the sensor housing in the circumferential direction about its longitudinal axis, be clipped transversely to the longitudinal axis of the sensor housing onto the latter, that is, latched onto it in a clamping manner.

When the first calibration body is arranged at the sensor housing in such a manner that incidence of light from the external environment into the fluid capturing region is no longer possible, a first calibration-ready operational state of the turbidity sensor assembly has been reached. In this first calibration-ready operational state, the first calibration body at least contributes to the screening of the fluid capturing region against incoming electromagnetic radiation of a particular wavelength range, in particular against incoming light radiation including infrared and UV light, from the external environment. The fluid capturing region can then be surrounded in part by the sensor housing and in another part by the first calibration body, in order to effect the screening of the fluid capturing region against the aforementioned incoming radiation from the external environment. In the first calibration-ready operational state, the first radiation sensor is consequently no longer accessible to ambient light and/or electromagnetic radiation from the environment as the case may be, but remains accessible to radiation emitted by the radiation source. Thus the signal of the first radiation sensor can be corrected and/or calibrated as the case may be with respect to a change in the emission characteristic of the radiation source and/or a change in the capture characteristic of the first radiation sensor.

The possible temporal change in the emission characteristic of the radiation source and/or in a radiation sensor modifies not only the signal produced by the first radiation sensor under irradiation by the radiation source, but also the signal produced by the second radiation sensor. Therefore, appropriate correction of the signal of the second radiation sensor for adjustment to a changed emission characteristic and/or to a change in the capture characteristic of the second radiation sensor is helpful for the accuracy achievable with the turbidity sensor.

Additionally or alternatively, the present invention therefore concerns a turbidity sensor assembly comprising a previously described turbidity sensor and a second calibration body for calibrating the turbidity sensor.

The second calibration body serves for calibrating the second radiation sensor. The second calibration body therefore ensures that the second radiation sensor is reached only by radiation from the fluid capturing region, but not by radiation reflected from the sensor housing or from the first disc or by radiation from the external environment.

For rapid, even at short notice, and at the same time secure deployment, the second calibration body is preferably connectable detachably with the sensor housing. For preference, the second calibration body can be slid out transversely to the longitudinal axis of the sensor housing onto the latter. So that the second calibration body does not have to be permanently held at the sensor housing during the calibration of the second radiation sensor, the second calibration body is preferably latchable at the sensor housing, for instance by the second calibration body gripping the sensor housing incompletely in the circumferential direction about its longitudinal axis. The second calibration body can therefore be configured at least section-wise as a clamp which can be clipped onto the sensor housing transversely to the longitudinal axis of the sensor housing.

In a second calibration-ready operational state of the turbidity sensor assembly, the second calibration body screens the fluid capturing region against incoming light radiation or generally against incoming electromagnetic radiation of a particular wavelength range from the external environment. In this respect, what was said about the first calibration body applies also to the second calibration body. In this second calibration-ready operational state, the fluid capturing region is preferably surrounded by the sensor housing and by the second calibration body. These can then effect the screening.

In order to prevent as far as possible reflection through the sensor housing and/or through the first disc of radiation emitted by the radiation source, the second calibration body preferably exhibits a blockade formation which in the second calibration-ready operational state is arranged between the first and the second radiation sensor and screens the first radiation sensor against radiation emitted by the radiation source. In the second calibration-ready operational state, the blockade formation is preferably situated between the radiation source and the first disc, in particular between the second radiation sensor and the first disc.

The blockade formation is preferably connected firmly with a fixing section of the second calibration body, with which the second calibration body can be fixed at the sensor housing, in particular can be fixed in the aforementioned manner. The blockade formation can be configured integrally with the fixing section, for example through injection molding. The blockade formation can alternatively comprise a mounting in which a blockade body can be set. In this manner, different blockade bodies can be arranged at the second calibration body and thus the second calibration body adjusted for different situations.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which forms a part hereof and wherein.

DESCRIPTION OF PREFERRED EMBODIMENTS

Figure 1:
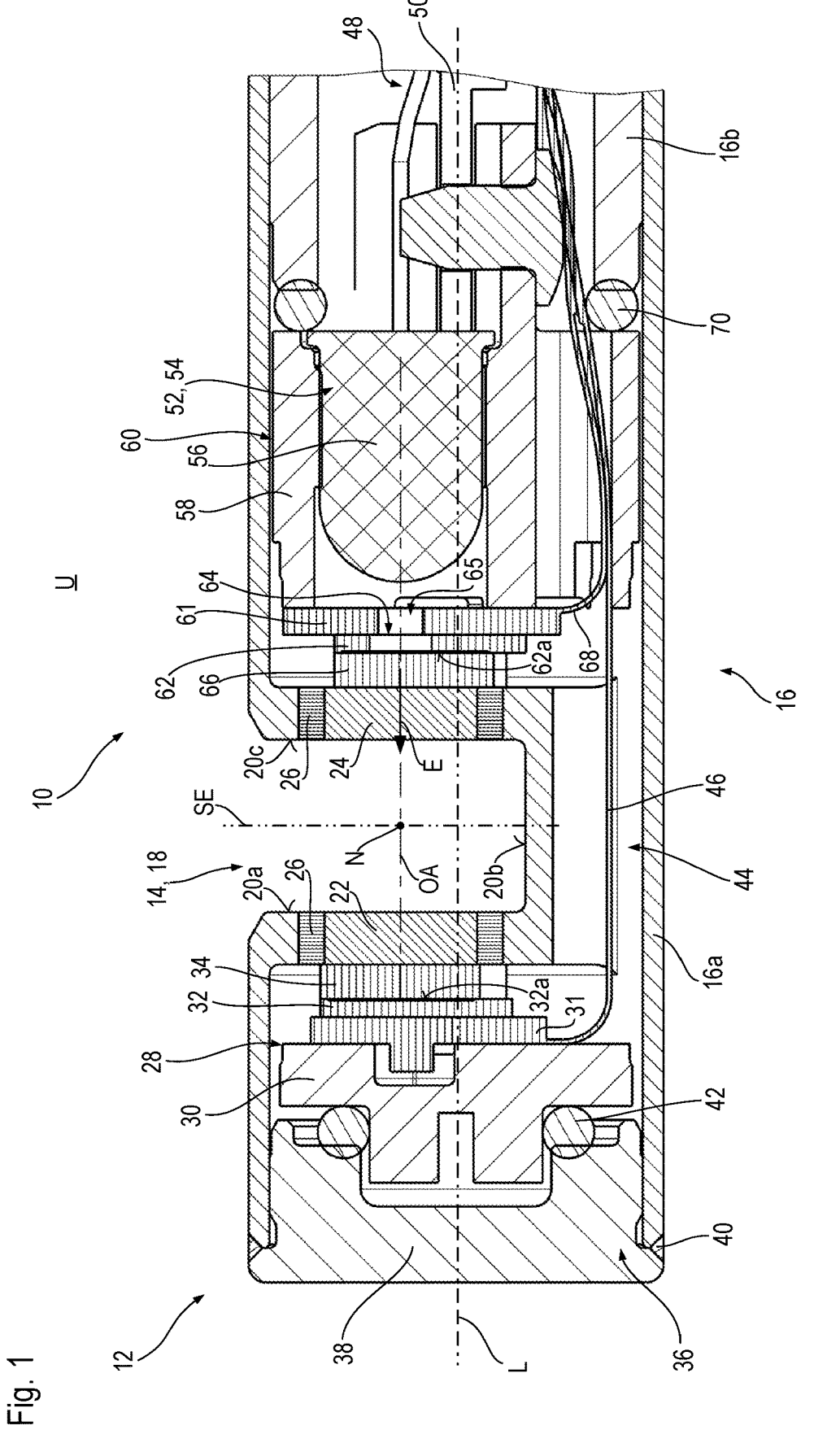
FIG. 1 A rough schematic longitudinal section through the capture end of a turbidity sensor according to the invention, FIG. 2 A rough schematic perspective partial section view of the capture end of the turbidity sensor of FIG. 1, FIG. 3 A rough schematic longitudinal section through the capture end of the turbidity sensor of FIG. 1 with first calibration body attached to it calibration-ready, and FIG. 4 A rough schematic longitudinal section through the capture end of the turbidity sensor of FIG. 1 with second calibration body attached to it calibration-ready.
Figure 2:
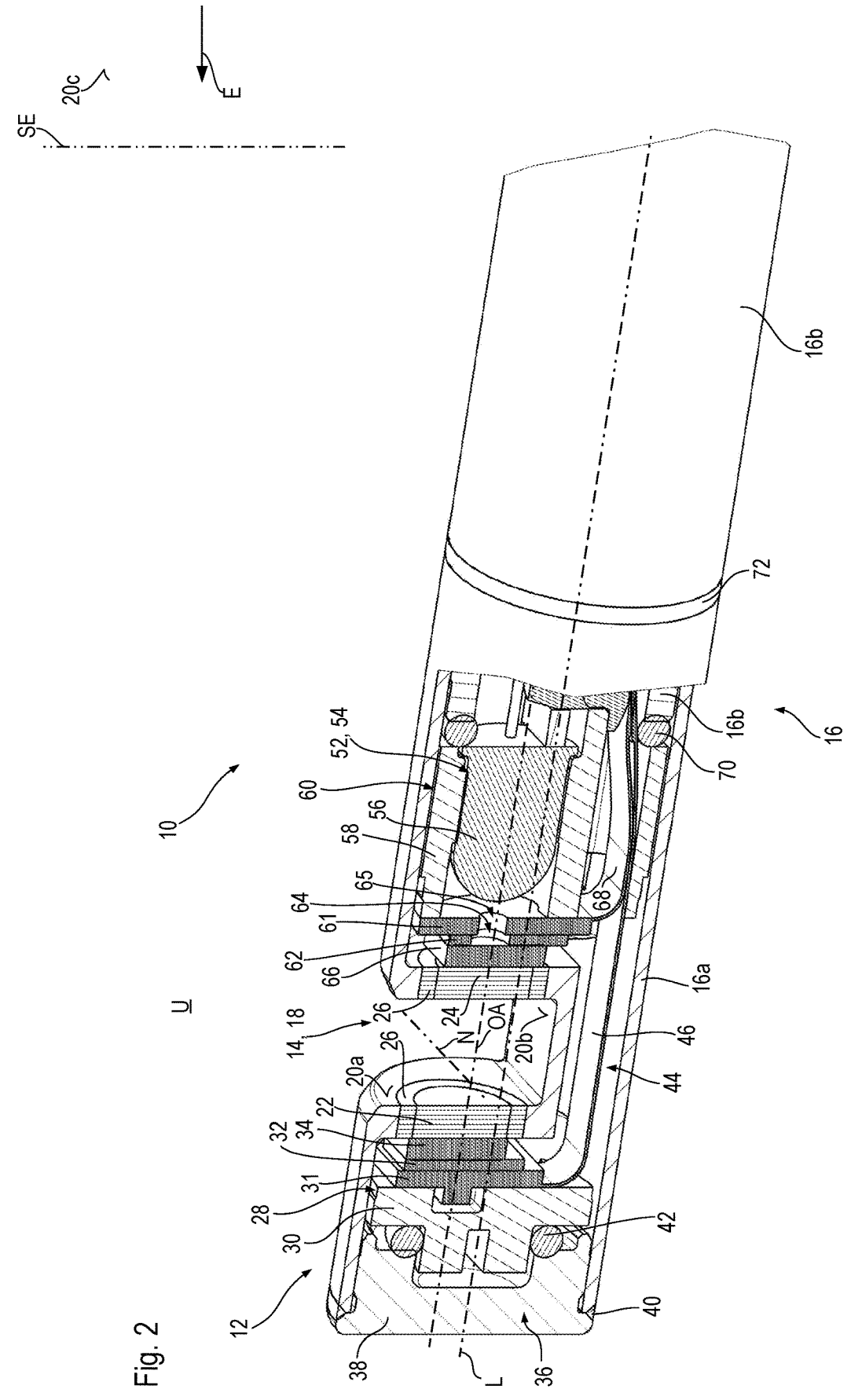

Referring now to the drawings wherein the showings are for the purpose of illustrating preferred and alternative embodiments of the invention only and not for the purpose of limiting the same, in FIGS. 1 and 2, a turbidity sensor according to the invention is denoted generally by 10. The capture end 12 of the turbidity sensor 10, at which the fluid capturing region 14 is configured, is depicted specifically in FIGS. 1 and 2. With this capture end 12 the turbidity sensor 10 is immersed during capture operation in a fluid, normally a liquid, in order to measure its turbidity. As expected, the fluid contains suspended matter, in particular biological cells.

At a connecting end not depicted in the drawings, opposite to the capture end 12 with respect to a longitudinal axis L, the turbidity sensor can be configured for the transmission of capture data, for example through a connecting cable exiting from the connecting end or through a connecting interface, for instance a socket, which is configured for detachable connection of a signal transmission line.

The turbidity sensor 10 extends along the virtual longitudinal axis L and exhibits a sensor housing 16 which for reasons of facilitated assembly is preferably in several parts, and which in the depicted embodiment example has a cylindrical shape. The longitudinal axis L is then the cylinder axis of the sensor housing or at least of its cylindrical sections. An exception to the cylindrical shape is formed here by a fluid capturing region 14, which is configured as a groove-shaped recess 18 of a sensor housing part 16a on the capture-end side, which however still extends completely inside a cylindrical envelope of the sensor housing, or at least of the sensor housing part 16a, which abuts against the cylindrical outer surfaces of the sensor housing 16. The groove-shaped recess 18 proceeds along a virtual groove axis N, which extends at a distance from the virtual longitudinal axis L conceived as penetrating centrally through the sensor housing 16 and orthogonally to it.

The fluid capturing region 14 is surrounded on three sides by outer surfaces 20a, 20b, and 20c of the sensor housing 16, in particular of the sensor housing part 16a. The outer surfaces 20a, 20b, and 20c of the sensor housing 16 which enclose the fluid capturing region 14 are preferably planar, where preferably respective pairs of mutually bordering outer surfaces 20a and 20b on the one hand and 20b and 20c on the other enclose between them a right angle.

The outer surface 20a is formed in part by the outer surface of a first disc 22 which is accommodated in the sensor housing 16, in particular in the sensor housing part 16a. Due to the high scratch resistance and chemical durability, the first disc 22 is preferably made from a mineral material, where under the mineral materials corundum is more strongly preferred and under the corundums sapphire glass is most strongly preferred. The opposite outer surface 20c which preferably is parallel to the outer surface 20a is formed in part by the outer surface of a second disc 24. The second disc 24 is preferably structurally identical in terms of its dimensions and its material with the first disc 22.

The fluid capturing region 14 is configured, together with the walls of the sensor housing 16 which enclose it, mirror-symmetrically with respect to a mirror-symmetry plane SE which contains the groove axis N and is orthogonal to the longitudinal axis L and to the drawing plane of FIG. 1. The discs 22 and 24 are bonded to the rest of the sensor housing 16 firmly and tightly through a thermally meltable and solidifiable cement 26. The solidified cement 26 runs in a closed manner along a surrounding edge of the discs 22 and 24 around each of the discs 22 and 24. The rest of the sensor housing 16 is preferably made from stainless steel.

Now that the structure of the fluid capturing region 14 and of the region of the sensor housing 16 has been described, the construction of the sensor technology in the turbidity sensor 10 will be elucidated below.

Between the free longitudinal end and the fluid capturing region 14 there is arranged in the sensor housing 16 a first radiation sensor assembly 28. The first radiation sensor assembly 28 comprises a first mounting component 30, preferably integrally injection-molded, onto which a first radiation sensor 32 which is accommodated on a first circuit board 31 is mounted. Between the first radiation sensor 32 and the first disc 22 there is arranged a first optical filter 34 which lets through electromagnetic radiation in the wavelength range of 840 nm or longer and blocks radiation with shorter wavelengths.

The first radiation sensor assembly 28 was introduced into the sensor housing 16 through an end-side aperture 36 of the sensor housing 16. The aperture 36 is now closed off by a housing lid 38, which is firmly bonded, preferably through a laser welding seam 40, with the sensor housing 16, in particular to the sensor housing part 16a. Between the first radiation sensor assembly 28 and the housing lid 38 there is arranged an elastomeric O-ring 42, which in the present embodiment example mainly serves to exert a pre-tensioning force on the first radiation sensor assembly 28 acting towards the first disc 22. The O-ring 42 is directly in abutment engagement with the housing lid 38 on the one hand and with the mounting component 30 on the other. Through the pre-tensioning force, the first radiation sensor 32 together with the first optical filter 34 is pre-tensioned to abutment against the inner surface of the disc 22.

Under the outer surface 20b which connects the outer surfaces 20a and 20c in a bridging manner there runs a line tunnel 44 in which a signal transmission line 46 runs from the first radiation sensor 32 to an electronic module 48 which is accommodated in the sensor housing 16, in particular in a second sensor housing part 16b. The electronic module 48 comprises a circuit board 50 with a plurality of electronic components arranged on it.

One of the electronic components of the module 48 is an LED 52, which serves as radiation source 54 of the turbidity sensor 10. The LED 52 emits light in the near infrared wavelength range, preferably at a wavelength of 840 to 860 nm. The LED 52 is surrounded by a glass body 56 which ensures high temperature-insensitivity of the LED 52. The discs 22 and 24 are transparent to the radiation emitted by the LED 52.

LED 52 is accommodated in a second mounting component 58, which is a component of a second radiation sensor assembly 60. The second mounting component 58 is preferably integrally injection-molded. It carries on its side which faces away from the electronic module 48 a second radiation sensor 62 accommodated on a second circuit board 61.

The second radiation sensor 62 is situated directly between the LED 52 and the first radiation sensor 32. The optical axis of LED 52 is denoted in FIG. 1 by OA. It is the shortest path between LED 52 and the photosensitive sensor capturing surface 32a of the first radiation sensor 32 facing towards the first disc 22. The optical axis OA, which is parallel to the longitudinal axis L of the sensor housing 16, also shows a beam path of radiation emitted by the LED 52 up to the first radiation sensor 32.

The second radiation sensor 62 is arranged in this beam path. So that the second radiation sensor 62 can have radiation emitted by the LED 52 shining through it, the second radiation sensor 62 exhibits an aperture 64 penetrating through it in the thickness direction, viz. preferably in such a way that the optical axis OA forms a virtual central axis of the aperture 64. Likewise, the second circuit board 61 exhibits an aperture 65, preferably coaxial with the aperture 64. Through the apertures 64 and 65, radiation emitted by the LED 52 can first reach the fluid capturing region 14. From there that radiation fraction which is not incident on suspended matter present in the fluid capturing region 14 and is absorbed or scattered by it, can traverse the fluid capturing region 14 and reach the first radiation sensor 32. That radiation fraction which in contrast is scattered or reflected respectively by suspended matter in the fluid capturing region 14 with a radiation component opposite to the incident direction E, can reach the second radiation sensor 62.

In front of the photosensitive sensor capturing surface 62a of the second radiation sensor 62 there is also situated an optical filter 66, which is identical with the optical filter 34 between the first radiation sensor 32 and the first disc 22. The optical filter 66 can likewise exhibit an aperture penetrating through it in the thickness direction, which continues the aperture 64 of the second radiation sensor 62 along the optical axis OA. In the present embodiment example, the optical filter 66 exhibits no such aperture, such that radiation emitted by the LED 52 reaches the fluid capturing region 14 only after passing the optical filter 66 and thus only in the wavelength range let through by the optical filter 66.

Due to the simultaneous capture by means of the first radiation sensor 32 of radiation traversing in a straight line and by means of the second radiation sensor 62 of radiation scattered or reflected respectively against the incident direction E, with the arrangement proposed here, in which the second radiation sensor 62 is arranged in the beam path of radiation emitted by the LED 52 towards the first radiation sensor 32, a very slim turbidity sensor 10 can be obtained with high measurement accuracy over a wide quantitative range of suspended matter contained in a fluid to be captured metrologically.

An allocation of the signals provided by the individual radiation sensors 32 and 62 to the turbidity of the fluid to be captured metrologically in the fluid capturing region 14 and consequently, given known type and structure of the suspended matter contained in the fluid, to the quantity of the suspended matter contained in a reference volume of the fluid, can be obtained through calibration of the turbidity sensor by means of different calibration fluids. The calibration fluids differ here preferably only in terms of the quantity of suspended matter contained in a reference volume of the respective calibration fluid, such that a difference in the sensor signals during the calibration can be attributed directly to a difference in the quantity of suspended matter based on the fluid volume. Experiments have shown that with the turbidity sensor 10 presented here, with preferably parallel and planar photosensitive sensor capturing surfaces 32a and 62a facing towards one another of the radiation sensors 32 and 62 respectively, of which that of the second radiation sensor 62 lies in the beam path of LED 52 to that of the first radiation sensor 32, the capture signals provided by the radiation sensors 32 and 62 and/or a cumulative capture signal determined from same show or shows respectively a highly advantageous linear change behavior in dependence on a change in the quantity of suspended matter in a reference volume of the fluid to be captured metrologically. This linear behavior is present advantageously over essentially the entire measurement range, based on the turbidity and/or the capturable quantity of suspended matter related therewith, as the case may be.

Merely for the sake of completeness let it be mentioned that the second radiation sensor 62 too, is connected through a signal transmission line 68 with the electronic module 48 in a signal-transmitting manner.

The second sensor assembly 60 is sealed by a second elastomeric O-ring 70 against the sensor housing 16, in particular against an inner wall of the first sensor housing part 16a. The gap, discernible in the depiction of FIG. 1, between the inner wall of the first sensor housing part 16a and the second O-ring 70 is due merely to the depiction of the second O-ring 70 in the undeformed state. Given correct depiction of the actually present deformed state, the second O-ring 70 abuts against the denoted inner wall. At the same time, the second O-ring 70 is in abutment engagement with an end face of the second housing part 16b such that the second O-ring 70 through abutment engagement with the second sensor assembly 60, pre-tensions the second sensor assembly 60 towards the second disc 24.

The second O-ring 70 abuts on the one hand directly against the back of the LED 52 and exerts a pre-tensioning force directly on the LED 52 in the direction of the second disc 24. Thereby the LED 52 is pre-tensioned into the recess which accommodates it in the second mounting component 58.

On the other hand, the second O-ring 70 abuts directly against the second mounting component 58 and tensions it together with the second radiation sensor 62 mounted on it in the direction towards the second disc 24 and in abutment against the latter.

The second sensor housing part 16*b* can be firmly bonded, preferably through a laser welding seam 72, with the first sensor housing part 16*a*.

Figure 3:
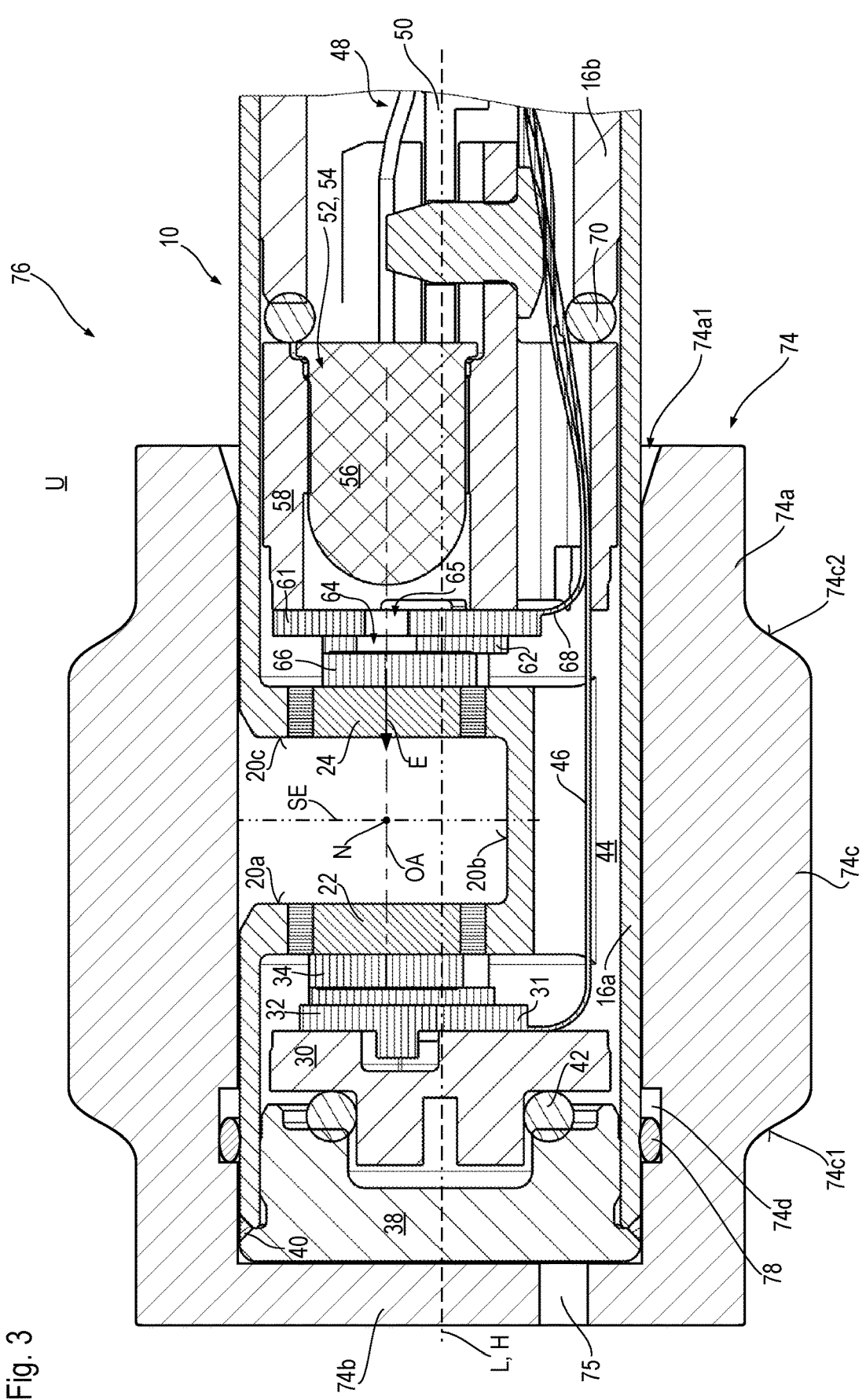

In FIG. 3, the capture end 12 of the turbidity sensor 10 is depicted again, where for improved clarity only some of the components and component sections already known from FIG. 1 are provided again with reference symbols in FIG. 3. Due to the match between the depictions of the capture end 12 in FIGS. 1 and 3, the reference symbols provided in FIG. 3 suffice, when also considering FIG. 1 additionally, for recognizing the turbidity sensor 10. Components and component sections not denoted by reference symbols in FIG. 3 are identically depicted and provided with reference symbols in FIG. 1.

In FIG. 3, a first calibration body 74 is arranged calibration-ready at the capture end 12 of the turbidity sensor 10 for calibration and/or correction respectively of the first radiation sensor 32. The first calibration body 74 spans the fluid capturing region 14, such that no ambient light from the external environment U outside the turbidity sensor 10 and outside the fluid capturing region 14 reaches the fluid capturing region 14 and thereby the first radiation sensor 32.

The first calibration body 74, which with the turbidity sensor 10 forms a first turbidity sensor assembly 76, is configured jar-like and extends along a sleeve axis H. The sleeve axis H, which can be a rotation-symmetry axis of the first calibration body 74 which preferably is configured as rotationally symmetrical, is collinear with the longitudinal axis L of the turbidity sensor 10 in the first calibration-ready state depicted in FIG. 3.

The first calibration body 74 comprises a casing wall 74*a* surrounding the sensor housing 16, in the depicted example more precisely the first sensor housing part 16*a*, in the circumferential direction about the longitudinal axis L and comprises a base wall 74*b* running orthogonally to the longitudinal axis L and closing off the casing wall 74*a* at one longitudinal end. The base wall 74*b*, which is situated at the longitudinal end of the first calibration body 74 opposite to the insertion aperture 74*a*1 of the first calibration body 74, is functionally not absolutely necessary, but serves as an advantageous end stop, such that the user, who preferably slides the first calibration body 74 along the longitudinal axis L starting from the capture end 12 onto the turbidity sensor 10, can also recognize the correct relative position of the first calibration body 74 relative to the turbidity sensor 10 haptically. For producing the first calibration-ready state of the first turbidity sensor assembly 76 shown in FIG. 3, it suffices to slide the first calibration body 74 axially so far over the capture end 12 along the longitudinal axis L until the base wall 74*b* abuts physically against the free front face of the capture end 12 of the turbidity sensor 10.

To facilitate the sliding on and off of the first calibration body 74 onto or from the sensor housing 16 respectively, in particular onto or from the first sensor housing part 16*a* respectively, the first calibration body 74 exhibits in the depicted embodiment example at its casing wall 74*a* a thickening 74*c*, whose flanks 74*c*1 and 74*c*2 which also point along the longitudinal axis L facilitate a manual force engagement by a user. The thickening 74*c* preferably runs in a closed manner around the circumferential direction.

To further facilitate the sliding on and off of the first calibration body 74 onto or from the sensor housing 16 respectively, there is configured in the base wall 74*b* a duct 75 which penetrates through the base wall 74*b* through which air can flow for pressure equalization from one side of the base wall 74*b* to the respective other side.

An elastomeric ring 78, for instance in the form of an O-ring seal, which is accommodated in a groove 74*d* on the inside of the casing wall 74*a*, is deformed in the depicted first calibration-ready state between the inside of the casing wall 74*a* and the outside of the sensor housing 16, in particular of the first sensor housing part 16*a*, thus holding the first calibration body 74 in a frictionally engaged manner to the turbidity sensor 10 in the first calibration-ready state shown in FIG. 3. The clearance of the calibration body 74 which is to be measured orthogonally to the longitudinal axis L is slightly greater than the diameter of the section of the sensor housing 16 inserted into the first calibration body 74. The recess of the calibration body 74 can be configured with a clearance fit with respect to the outside diameter of the section of the sensor housing 16 to be inserted into the first calibration body 74.

Of the clear depth of the first calibration body 74, to be measured along the longitudinal axis L, along which the capture end 12 of the turbidity sensor 10 protrudes into the calibration body 74, the elastomeric ring 78 is preferably arranged in the last fourth, especially preferably in the last fifth, in order to make sure that the first calibration body 74 is only held in a frictionally engaged manner by the elastomeric ring 78 at the capture end 12 of the turbidity sensor 10 once the first calibration body 74 securely screens the fluid capturing region 14 vis-à-vis the external environment against incident light.

In the first calibration-ready state of the first turbidity sensor assembly 76, only radiation emitted by the radiation source 54, i.e. by the LED 52, reaches the first radiation sensor 32. Consequently, a capture state of the radiation sensor 32 can be assigned qualitatively and/or quantitatively to an energization state of the LED 52. Any possibly occurring change in the emission characteristic of the LED 52 caused by ageing and/or any possibly occurring change in the capture characteristic of the first radiation sensor 32 caused by ageing vis-à-vis a respective new state can thereby be taken into consideration and corrected through the assigning of capture states of the first radiation sensor 32, such that the change caused by ageing in the emission characteristic and/or in the capture characteristic does not lead to faulty capture by the first radiation sensor 32.

Figure 4:
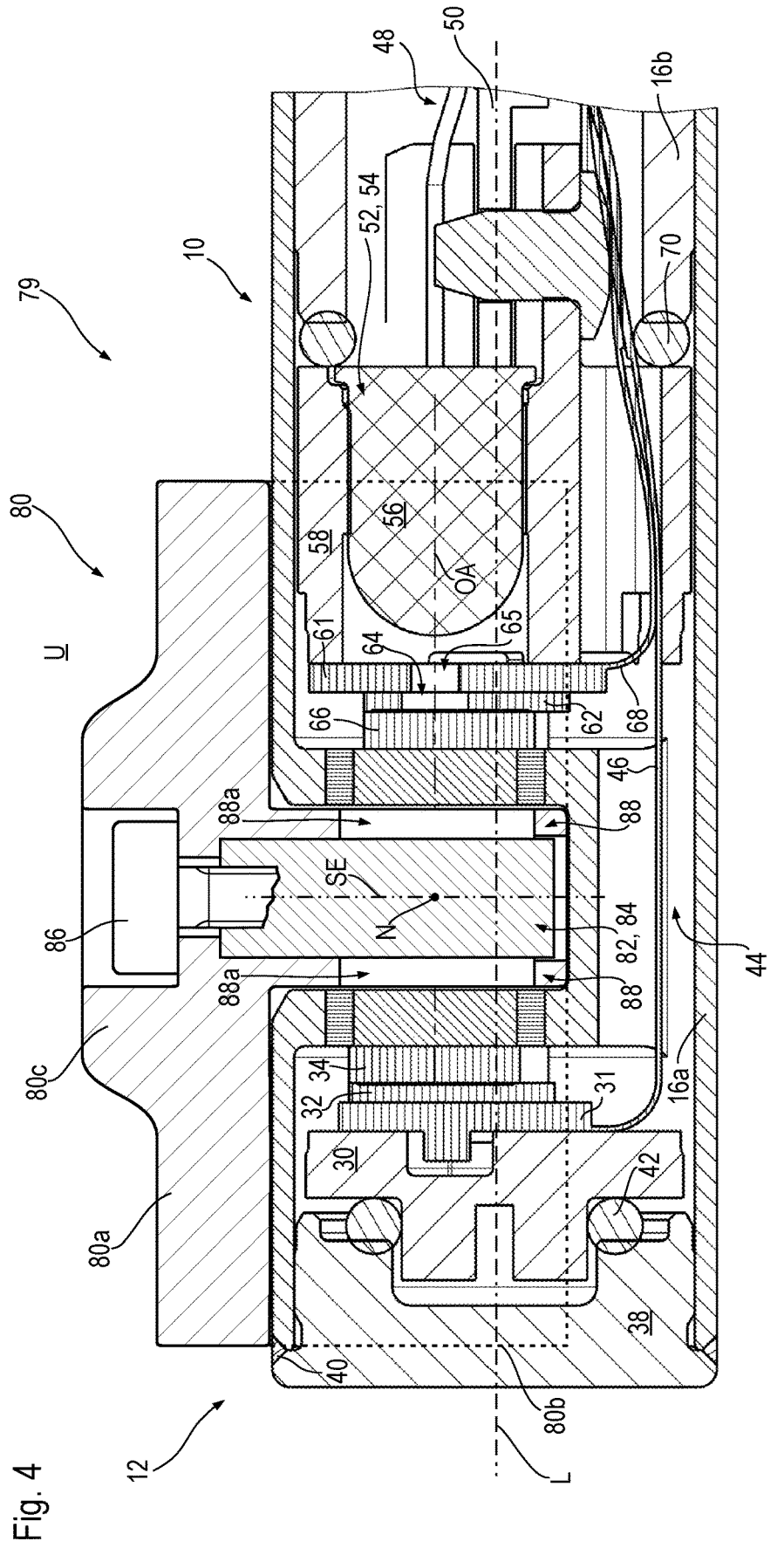

In FIG. 4 there is depicted a second turbidity sensor assembly 79 which comprises the turbidity sensor 10 of FIG. 1 and a second calibration body 80. As in the case of FIG. 3, in FIG. 4 too for improved clarity only some of the components and component sections of the turbidity sensor 10 are provided with reference symbols. Through comparison with FIG. 1, the components and component sections of the turbidity sensor 10 not provided with reference symbols in FIG. 4 can be readily identified.

The second calibration body 80 is configured as a clamp, which in the second calibration-ready state of the second turbidity sensor assembly 78 depicted in FIG. 4 incompletely grips the section of the turbidity sensor 10 exhibiting the fluid capturing region 14 in the circumferential direction about the longitudinal axis L. However, the second calibration body 80 grips the turbidity sensor 10, in particular the section of the first sensor housing part 16*a* exhibiting the fluid capturing region 14, by more than half the circumference of the first sensor housing part 16*a*, such that due to its component elasticity the second calibration body 80 can be latched onto the turbidity sensor 10.

In contrast to the first calibration body 74, which is slid along the longitudinal axis L onto the capture end 12 of the turbidity sensor 10, in the depicted example the second calibration body 80 is clipped orthogonally to the longitudinal axis L onto the turbidity sensor 10.

In further contrast to the first calibration body 74, the second calibration body 80 exhibits on its inside which faces towards the turbidity sensor 10 a blockade formation 82 projecting from the inside. In the depicted embodiment example, the blockade formation 82 is formed through a block 84 which is opaque to radiation of the LED 52, which in the second calibration-ready state protrudes into the fluid capturing region 14 and fills the fluid capturing region 14 to such an extent that the disc 22 and its housing surroundings are not reached by radiation of the LED 52 and consequently no radiation reflected from the disc 22 and its housing surroundings can be incident on the second radiation sensor 62.

The block 84 is connected detachably via a bolt 86 shown only in partial section with a clamp component 80a configured for latching attachment to the turbidity sensor 10. If required, the block 84 can be exchanged for another block of another color and/or another surface quality.

Apart from that, the clamp component 80a or the second calibration body 80 as the case may be once again screens the fluid capturing region 14 against electromagnetic radiation from the external environment U. Thereby only radiation which was emitted by the LED 52, i.e. by the radiation source 54, reaches the second radiation sensor 62.

Thereby, if required, the capture characteristic of the second radiation sensor 62 can be adjusted for a change in the emission characteristic of the LED 52 caused by ageing and/or to a change in the capture characteristic of the second radiation sensor 62 caused by ageing, thus a faulty capture by the second radiation sensor 62 due to a change in the emission characteristic of the LED 52 and/or due to a change in the capture characteristic of the second radiation sensor 62 avoided and/or corrected as the case may be.

The second calibration body 80 acts with its blockade formation 82 according to the lock-and-key principle together with the sensor housing 16 and the fluid capturing region 14 configured at it. To facilitate the handling of the second calibration body 80, it too, in particular the clamp component 80a, exhibits a thickening 80c. The edge of the clamp jaws of the clamp component 80a lying in front and behind the drawing plane, which grip around the sensor housing 16 incompletely in the circumferential direction, is indicated by a dashed line and labeled with the reference symbol 80b.

The block 84 is situated in the depicted embodiment example between two cheeks 88, preferably configured integrally with the clamp component 80a, each of which exhibits an aperture 88a through which the block 84 is accessible to radiation from the LED 52. The block 84 exhibits defined reflectance properties which under predetermined energization of a factory-new LED 52 allow a predetermined radiation fraction incident on the second radiation sensor 62 to be expected. If the radiation fraction actually incident on the second radiation sensor 62 deviates from the predetermined expected radiation fraction, then based on the deviation the capture behavior of the second radiation sensor 62 can be corrected.

When correcting changes caused by ageing in the LED 52 and in the first or the second radiation sensor 32 and/or 62 respectively, the LED 52 and the respective radiation sensor 32 and/or 62 as the case may be can be regarded as one functional unit of radiation source and sensor and corrected as a unit. Then advantageously it makes no difference which component to what extent is subject to functional changes.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A turbidity sensor for capturing a cloudiness of a fluid through suspended matter contained in the fluid, where the turbidity sensor comprises:
   a fluid capturing region for accommodating and for metrological capturing of fluid,
   a radiation source for emitting radiation into the fluid capturing region,
   a first radiation sensor for capturing a first part of the radiation emitted by the radiation source, and
   a second radiation sensor different from the first radiation sensor for capturing a second part different from the first part of the radiation emitted by the radiation source,
   wherein at least one section of the fluid capturing region is situated between the first and the second radiation sensor,
   wherein the second radiation sensor is situated in a beam path of the first part captured by the first radiation sensor of the radiation emitted by the radiation source.

2. The turbidity sensor according to claim 1, wherein the second radiation sensor exhibits an aperture penetrating through it through which radiation emitted by the radiation source arrived from the radiation source to the first radiation sensor.

3. The turbidity sensor according to claim 1, wherein the first radiation sensor exhibits a planar first radiation-sensitive sensor capturing surface which faces toward the second radiation sensor and that the second radiation sensor exhibits a planar second radiation-sensitive sensor capturing surface which faces toward the first radiation sensor.

4. The turbidity sensor according to claim 3, wherein the first and the second sensor capturing surface are arranged parallel to one another.

5. The turbidity sensor according to claim 1, wherein the radiation source, the first radiation sensor, and the second radiation sensor are accommodated in a sensor housing and are screened by the sensor housing against the external environment of the sensor housing, where the fluid capturing region is open to the external environment of the sensor housing.

6. The turbidity sensor according to claim 5, wherein at least one section of the sensor housing facing towards the second radiation sensor is surface-processed in order to modify its reflectance in the wavelength range of the radiation emitted by the radiation source.

7. The turbidity sensor according to claim 5, wherein the sensor housing exhibits a first and a second disc, each of which lets through radiation of the radiation source, where the first and the second disc lie at a distance from one another opposite one another in the beam path of the radiation source and where the first disc screens the first radiation sensor and the second disc the second radiation sensor against the fluid capturing region situated between the first and the second disc.

8. The turbidity sensor according to claim 7, wherein at least one of the first and the second disc is made from a mineral material.

9. The turbidity sensor according to claim 7, wherein the first radiation sensor is pre-tensioned in the direction towards the first disc through a first pre-tensioning force and/or that the second radiation sensor is pre-tensioned in the direction towards the second disc through a second pre-tensioning force.

10. The turbidity sensor according to claim 9, wherein the first radiation sensor is accommodated in a first radiation sensor assembly, where the first radiation sensor assembly is sealed against a first housing component of the sensor housing by means of a first sealing component, where the first sealing component effects the first pre-tensioning force.

11. The turbidity sensor according to claim 9, wherein the second radiation sensor is accommodated in a second radiation sensor assembly, where the second radiation sensor assembly is sealed against a second housing component of the sensor housing by means of a second sealing component, where the second sealing component effects the second pre-tensioning force.

12. The turbidity sensor according to claim 11, wherein in the second radiation sensor assembly the radiation source is also accommodated.

13. The turbidity sensor according to claim 12, wherein the radiation source is in abutment engagement with the second sealing component, such that the sealing component pre-tensions the radiation source directly towards the second disc.

14. The turbidity sensor according to claim 7, wherein the sensor housing extends with its largest dimension along a longitudinal axis, where the first and the second disc are each accommodated at the sensor housing oriented transversely to the longitudinal axis.

15. A turbidity sensor assembly, comprising the turbidity sensor according to claim 14, and a first calibration body for calibrating the turbidity sensor, the first calibration body being connectable detachably with the sensor housing in such a way that in a first calibration-ready operational state of the turbidity sensor assembly, the first calibration body at least contributes to a screening of the fluid capturing region from incoming radiation of light from the external environment of the turbidity sensor assembly, where in the first calibration-ready operational state the first radiation sensor is accessible to radiation emitted by the radiation source.

16. The turbidity sensor assembly according to claim 15, comprising a second calibration body for calibrating the turbidity sensor, the second calibration body being connectable detachably with the sensor housing in such a way that in a second calibration-ready operational state of the turbidity sensor assembly, the second calibration body at least contributes to a screening of the fluid capturing region from incoming radiation of light from the external environment of the turbidity sensor assembly, where the second calibration body exhibits a blockade formation which in the second calibration-ready operational state is arranged between the first and the second radiation sensor and screens the first radiation sensor against radiation emitted by the radiation source.

* * * * *